US 012089036B2

(12) United States Patent
Marinovic et al.

(10) Patent No.: US 12,089,036 B2
(45) Date of Patent: Sep. 10, 2024

(54) SYSTEMS, DEVICES, SOFTWARE, AND METHODS FOR MANAGING ACCESS USING WIRELESS SIGNALS

(71) Applicant: PwC Product Sales LLC, New York, NY (US)

(72) Inventors: Srdjan Marinovic, Washington, DC (US); Stillman Bradish, Washington, DC (US); Rebecca E. Cohen, Denver, CO (US); Tanner Payne, Falls Church, VA (US)

(73) Assignee: PwC Product Sales LLC, New York, NY (US)

( * ) Notice: Subject to any disclaimer, the term of this patent is extended or adjusted under 35 U.S.C. 154(b) by 219 days.

(21) Appl. No.: 16/046,857

(22) Filed: Jul. 26, 2018

(65) Prior Publication Data

US 2019/0037396 A1    Jan. 31, 2019

Related U.S. Application Data (60) Provisional application No. 62/537,454, filed on Jul. 26, 2017.

(51) Int. Cl.
*H04W 12/06*    (2021.01)
*H04L 9/40*    (2022.01)
*H04W 12/08*    (2021.01)

(52) U.S. Cl.
CPC ......... *H04W 12/06* (2013.01); *H04L 63/0876* (2013.01); *H04W 12/08* (2013.01)

(58) Field of Classification Search
CPC .... H04W 12/06; H04W 12/08; H04L 63/0876
See application file for complete search history.

(56) References Cited

U.S. PATENT DOCUMENTS

| | | | | |
|---|---|---|---|---|
| 10,348,567 | B2* | 7/2019 | Zhou | H04L 67/52 |
| 10,452,637 | B1* | 10/2019 | Jones | G06F 16/2343 |
| 10,572,900 | B2* | 2/2020 | Brown | G06Q 30/0267 |
| 2007/0029968 | A1 | 12/2007 | Plastina et al. | |
| 2007/0299681 | A1 | 12/2007 | Plastina et al. | |
| 2011/0306354 | A1 | 12/2011 | Ledlie et al. | |
| 2014/0006785 | A1 | 1/2014 | Shaliv et al. | |
| 2014/0023757 | A1 | 1/2014 | Christensen | |

(Continued)

OTHER PUBLICATIONS

International Search Report and Written Opinion mailed Oct. 15, 2018, directed to International Application No. PCT/US2018/43966; 6 pages.

*Primary Examiner* — Shewaye Gelagay
*Assistant Examiner* — Carlton Johnson
(74) *Attorney, Agent, or Firm* — Morrison & Foerster LLP (57) ABSTRACT

Hardware and/or software systems, devices, networks, and methods for managing for access authentication, and verification to devices, networks, and systems based on a wireless signal identity developed for wireless-enabled devices based on wireless signal information associated with wireless signals previously detected by the wireless-enabled devices. The system may be used to authenticate access requests, transactions, etc. based on comparison between wireless signal information associated with wireless signals presently detected by the WED and its wireless signal identity via a management platform and/or the WED itself.

16 Claims, 5 Drawing Sheets

(56) References Cited

U.S. PATENT DOCUMENTS

| | | | |
|---|---|---|---|
| 2014/0237574 A1* | 8/2014 | Aaron | H04L 63/126 726/7 |
| 2015/0228001 A1* | 8/2015 | Woycik | G06Q 30/0623 705/15 |
| 2016/0036035 A1 | 2/2016 | Hayner et al. | |
| 2016/0063471 A1* | 3/2016 | Kobres | H04L 63/08 705/18 |
| 2016/0360354 A1 | 12/2016 | Rhee et al. | |

* cited by examiner

SYSTEMS, DEVICES, SOFTWARE, AND METHODS FOR MANAGING ACCESS USING WIRELESS SIGNALS

CROSS-REFERENCE TO RELATED APPLICATIONS

This non-provisional patent application claims the benefit of and priority to U.S. Provisional Patent Application No. 62/537,454, filed Jul. 26, 2017, which is incorporated herein by reference in its entirety.

BACKGROUND OF THE INVENTION

Field of the Invention

The present invention relates in general to access management, and, more specifically to hardware and/or software systems, devices, networks, and methods for managing access to, and authentication and verification of users, devices, networks, and systems based on a wireless signals associated with user devices and systems.

Background Art

Wireless-enabled devices (WEDs) have seen increasingly widespread use in recent years as consumers have shown a growing interest in mobility in performing their day to day activity. Consumers may use phones, tablets, laptops, and many other devices in a variety of environments and situations, and as the number of users grow, so do the challenges in providing a secure and convenient service level to each user.

Various authentication solutions have been developed based on the trusted network concept in which a WED may include settings that a user may use to identify various networks that the WED trusts, such as a user's home and work networks, etc. When the WED encounters one of the trusted networks, the WED may reduce the level of security imposed by the WED. For example, if the WED is connected with their trusted home network, the WED may automatically unlock, remain unlocked for a longer period of time, automatically log into or keep open various software applications ("apps"), allow sharing among networked devices, etc. In addition, many applications running on a WED may enable a user to keep an application open, even when the WED is locked.

A broader application of the trusted network concept is the trusted location concept in which various geo-location services on a WED, such as GPS, cellular triangulation, local networks, etc. are used to determine whether the WED is in a trusted location, such as at home or work.

One of the problems associated with the trusted network and location and persistent login approaches to convenience and security is that the WED may get stolen or more generally come into the possession of a person that does not own, or is not authorized to use, the WED. In those instances, the convenience of the trusted network and locations, and persistent-login features of the WED provide a vulnerability that could expose, not only the WED, but the trusted networks and sensitive data thereon to unauthorized users of the WED.

In addition, the aforementioned approaches can often negatively impact the user experience by requiring the user to perform one or more multi-factor authentication procedures. The cumbersome nature of the multi-factor procedures can be an impediment to user adoption of these procedures or applications involving those procedures.

Consequently, there is a continuing need for improved systems, devices, and methods that provide increased levels of convenience for WED users, but with increased levels of security.

BRIEF SUMMARY OF THE INVENTION

Accordingly, hardware and/or software systems, devices, networks, and methods of the present invention enable users of WEDs to enjoy increased levels of access convenience with increased levels of security, by adding a seamless layer of authentication, such as access management, to support sensitive WED features, such as device, network, and application logins, transactions, etc.

In various embodiments, the system includes a wireless signal management platform and user WEDs that detect, or observe, wireless signals from other WEDs within its reception range. The management platform may receive wireless signal information, such as wireless device identifiers and other information, associated with wireless signals detected by WEDs, develop wireless signal identities for each of the WEDs based on the wireless signal information, then compare wireless signal information associated with the wireless signals subsequently detected by WEDs with their wireless signal identities, and provide measures of how well the wireless signal information from subsequently detected wireless signals compares with the wireless signal identities. The measures may be in the form confidence levels, such as on a continuous or interval scale of 0 to 1, based on how well the wireless signal information associated with recently detected wireless signals compares with the wireless signal identity of the WED and/or wireless signal information associated with previously detected wireless signals by the WED.

Wireless device identifiers (WDIs), e.g., MAC address, AdIDs, etc., and other wireless signal information, e.g., date, time, and location of detection, signal strength and other characteristics, etc., associated with the wireless signals may be stored and/or analyzed by the system and used to develop the wireless signal identity used to assess the status of the WEDs. The wireless signal information may be provided to the management platform 14 in unencrypted or encrypted form. In various embodiments, the WEDs and/or the management platform may encrypt some or all of the information being transmitted in the system.

In operation, the system may compare wireless signal information provided by the WED, as well as various devices and systems, such as building control systems, computer systems, third-party transactional systems, the wireless signal identities of other WEDs, etc. with the wireless signal identity to provide a measure of the WED status relative to its wireless signal identity to a requesting entity. How well the detected wireless signals compare to the wireless signal identity for the WED may be used to provide a measure of confidence or confidence level regarding the current status of the WED, which may be used by the requesting entity to take various actions.

The requesting entity may be any entity that may benefit from or have a use for a measure of how well wireless signals detected by the WED compare to the wireless signal identity of the WED. For example, service providers and others, such as communication, financial, retail, entertainment service providers, providers of travel-service or online-shopping apps, access administrators, etc., may provide applications running on the WEDs or other digital or nondigital services that may be configured to grant access or perform various functions depending upon the comparison of the detected wireless signals with the wireless signal identity of the WED.

If the detected wireless signals match well with the wireless signal identity, it may be a good indicator that the WED is in possession of the user (or at least is behaving normally), and the system may provide a high confidence level or other measure reflective of that indicator. The requesting entity may allow a standard procedure for such normal operation to be followed based on receiving the high confidence measure. An exact or near exact match, i.e., very high confidence, may be used by the requesting entity to streamline access control procedures for the user and their WEDs and applications running thereon. If the wireless signals detected by the WED do not match well with the wireless signal identity, e.g., some number or percentage of detected WDIs are not included in the wireless signal identity, or normally detected WDIs are not detected, the system may provide a low confidence measure. The requesting entity may decide to take greater precautions regarding actions initiated by the WED based on the low measure.

As may be disclosed, taught, and/or suggested herein to the skilled artisan, the present invention addresses the continuing need for hardware and/or software systems, devices, networks, and methods that enable improved access management, authentication and verification and applications based thereon.

BRIEF DESCRIPTION OF THE DRAWINGS

The accompanying drawings are included for the purpose of exemplary illustration of various aspects of the present invention to aid in description, and not for purposes of limiting the invention, wherein.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Hardware and/or software systems, devices, networks, and methods of the present invention are described herein, by way of example and otherwise.

Figure 1:
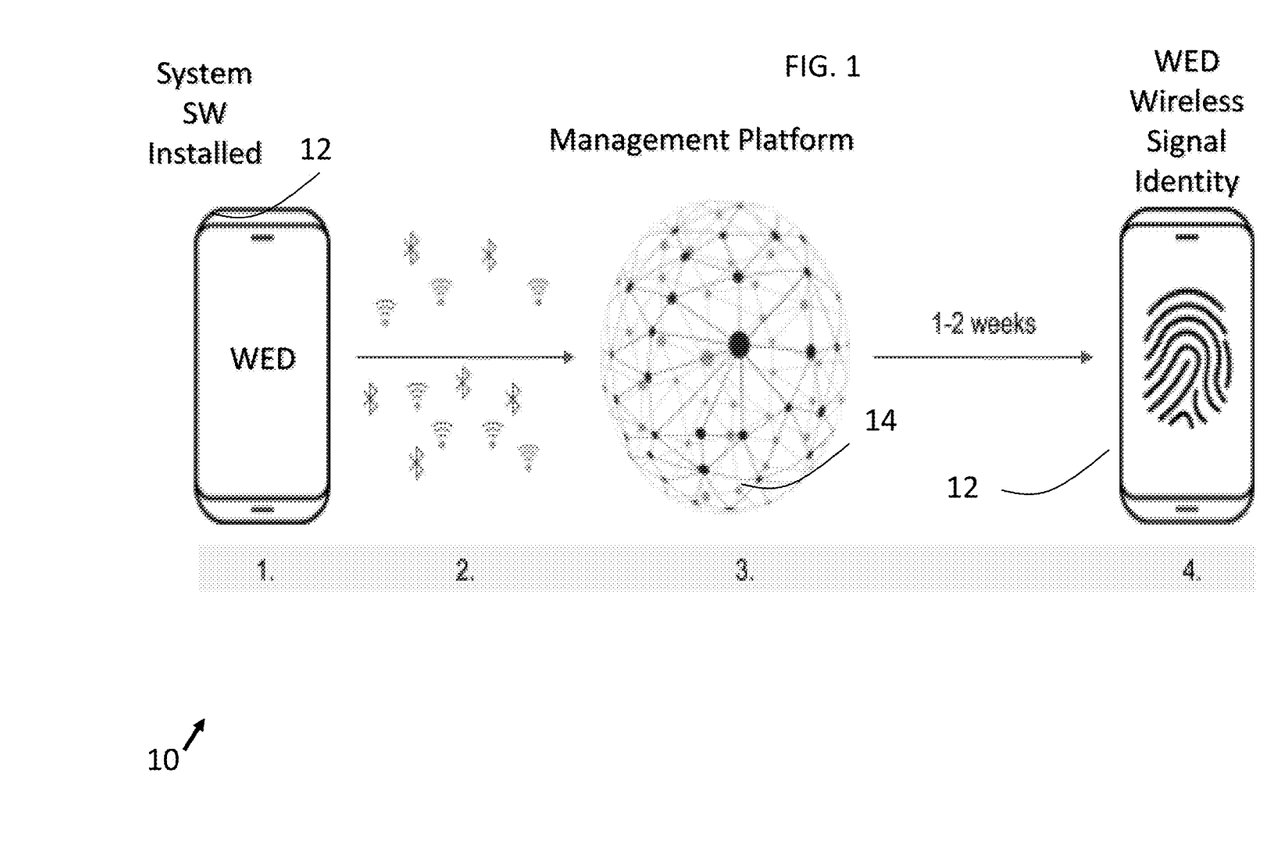
FIG. 1 illustrates exemplary embodiments of the system.

FIG. 1 illustrates exemplary embodiments of the system 10 in which one or more WEDs 12 interact with a wireless signal management platform (MP) 14, which may be centrally located or distributed. The system 10 develops a wireless signal identity (depicted as a fingerprint) for the WED 12 based on wireless signal detections by the WED 12, which may be used by the system 10 to evaluate further wireless signal detections and interactions of the WED 12 with previously detected and undetected WEDs and provide a confidence level or other measure to other device or entity interacting with the WED 12 and/or its user.

The rapid pace of technology continues to blur definitions pertaining to wireless devices and technology. Consequently, whether a device is a WED and applicable wireless technologies should be construed liberally. WEDs tend to include any device that is wirelessly enabled, irrespective of its underlying function including networking equipment, such as routers, switches, repeaters, beacons, readers, etc., stationary and mobile IoT devices, such as household appliances, sensors, vehicles, etc. and personal WEDs, such as watches and other wearables, phones, tablets, laptops, desktops, etc.

Furthermore, the present invention may be implemented with various wireless signal protocols and technologies including, but not limited to, Bluetooth®, Bluetooth Low Energy (BLE), Wi-Fi (IEEE 802.11), Wi-Fi Direct, Super-WiFi, 802.15.4, WiMax, LTE systems, LTE Direct, past, current, and future cellular standard protocols, e.g., 4-5G, or other wireless signal protocols or technologies. Various wireless network identifiers (WNIs) and wireless device identifiers (WDIs) may be employed, including, but are not limited to, LTE Direct Expressions and LTE Hardware ID, Universal Unique Identifier (UUID), SSID and MAC. In addition, it may be desirable for the system 10 to store multiple WNIs and/or WDIs for a given WED 12, if the WED 12 employs different identifiers for different protocols, networks, etc. It will be appreciated that the use of WNI and WDI is not intended to limit the invention to present identification technologies.

On any given day, an average mobile WED or static commercial WED, e.g., phones, tablets, wearables, etc. may detect, or observe, hundreds of wireless signals emitted by other WEDs. When the system 10 is enabled on the WED 12, typically via software, but possibly in hardware or both, the WED 12 may detect wireless signals and provide wireless signal information, such as WDIs, date, time, location of detection, signal strengths, etc., associated with the wireless signals to the system platform 14 for analysis and/or storage in a system database.

The system 10 may build the wireless signal identity for the WED 12 based on wireless signal information associated with the wireless signals detected by the WED 12. In various embodiments, the wireless signal identity may be developed by the system 10 based exclusively on wireless signals detected by the WED 12 over a period of time. The period of time and number of wireless signals used by the system 10 to develop the wireless signal identity may be determine by one of ordinary skill. Typically, the period of time and number of wireless signals detected and used in developing the wireless signal identity for the WED 12 will typically be based on the system 10 developing a relatively stable pattern of wireless signals being detected over the period of time, which may vary depending upon the application, etc. of the system 10. For example, the stable pattern may emerge in a few to several days, if the user has a normal work week routine. The wireless signal identity of the WED 12 may be based on the wireless signals most frequently detected by the WED 12 over the course of a day or other relevant period of time. For example, the wireless signal identity may vary by day of the week, time of the day, location, etc. based on the life patterns of the user of the WED 12. The system 10 may maintain in the management platform 14, e.g., in a database, some or all wireless signal detections, including single or low numbers of detections, as a running catalogue of detections of a particular WED 12, which may be used in subsequent wireless signal identity updates and authentications, even if those wireless signals did not presently contribute to the wireless signal identity.

In other embodiments, the wireless signal identity may also be configured by the WED user, various administrator(s), etc. depending upon the application. As mentioned elsewhere herein, the WED 12 may detect wireless signals from wireless-enabled devices that may not be part of the system 10 (a WED without the system software and/or hardware installed, i.e., a "non-system" or "unconnected" WED), but may be involved in one or more wireless signal identities for other WEDs 12 and users in the system 10. For example, a user of the system 10 may have various wireless electronic devices that are not running system software or are otherwise registered with the system 10, but its wireless signals may be regularly detected by a WED 12 and included in the wireless signal identity for that WED 12 and/or user.

The wireless signal information, e.g., WDI, date, time, and/or location of detection, signal strength, etc. may be provided to the management platform in unhashed or unencrypted form or alternatively, in hashed, encrypted, or otherwise anonymized form. In various embodiments, the WEDs 12 and/or the management platform 14 may encrypt some or all of the wireless signal information being transmitted in the system. For example, wireless signal information may be encrypted by an individual WED 12 and/or applications running on the WED 12. Encryption may also be performed at the management platform 14.

The WED 12 may employ a local processing algorithm on each app that encrypts, hashes, or otherwise anonymizes the wireless signals individually. The algorithm may be (1) different on an app-by-app basis so that the outputs differ across apps or (2) the same across all apps on the WED 12, so wireless signal information is encrypted consistently and does not differ from app to app.

In various embodiments, some or all of the wireless signals may be encrypted separately or together. For example, the WDIs of all wireless signals detected at a given time over a predetermined signal strengths may be sorted, concatenated, and encrypted or otherwise anonymized. The encryption may make it difficult or impossible to determine the number and identifiers of the wireless devices from the data ultimately stored in the system 10, but activity may still be authenticated, if the same wireless devices are present and meeting the same encrypting criteria. For example, a user may decide to encrypt their phone and wearable only and permit authentication only when the system receives that encrypted pair.

While it may be desirable for some applications to encrypt or otherwise anonymize the WDIs at the individual-device level, it will be appreciated that encryption at the individual device may limit that types of authentication and comparisons that can take place. For example, if two devices are individually encrypting WDIs from detected wireless signals, then the system 10 may not be able to use two-device collocation as a method for authenticating an interaction. In various embodiments, the system 10 may be configured to allow various applications to use the same encryption for multiple devices. As a consequence, each time that a device is detected by another device running that app, the detected device information will be encrypted with the same encrypted name, thereby allowing additional authentication services. One of ordinary skill in the art will appreciate that various types of encryption may be used in the present invention.

The wireless signal identity may be used in combination with historical usage and near-term behavior in terms of wireless signals detected by the WEDs 12 to enable requesting entities to provide various levels of identity authentication and verification for access, transactions, etc. For example, devices that are detected most frequently by WEDs 12 may provide a measure indicative of the highest level of confidence. For some users, a phone may most frequently detect a wearable that also tends to be with the user. Conversely, various wireless signals may be frequently detected at home or work, but not elsewhere, so the measure determined by the system 10 for use in authentication may vary during the course of a day and by day of the week.

It will be appreciated that the wireless signal identity of the WED 12 may be continuously, periodically, or manually evolved or maintained as static at least for periods of time. For example, if the WED 12 user is travelling, the system 10 may identify a significant deviation to the normally detected wireless signals, and may develop new wireless signal identities corresponding to new patterns of behavior.

In various embodiments, the system 10 may be used alone or as a multi-part authentication solution and provide persistent, behavior-based wireless signal identity monitoring with or without geolocation. The system 10 may be used to provide a measure of confidence that the WED 12 and/or user are 1) where they should be, and 2) within legitimate or typical use. In combination, the system 10 may provide wireless signal-based multi-factor authentication that may be used by the requesting entity to condition an overall security policy and govern WED transactions, without significantly affecting the quality of the user experience.

WED software applications ("apps") may leverage the system 10 to help users complete logins, mobile transactions, or gain secure access without the inconvenience and frustration of another physical token or key, PIN or password, or security questions. For example, a service-provider app running on the WED 12 may request the system 10 to provide a measure of the comparison of the wireless signals being detected by the WED 12 at that time with the wireless signal identity of the WED 12 to be used for authentication of the actions being requested. The user experience in terms of access, authorizations, etc. may be set by the service provider based on the measure provided by the system 10 to the service provider as the requesting entity. For example, if the measure provided by the system 10 is a confidence level between 0 and 1, the service provider may decide to deny access the WED 12, if the confidence level is below a minimum threshold, allow full access when the confidence level is above a full access threshold, and provide different levels of access between those thresholds.

The level of interaction by the application on the WED 12 or service provider devices and systems with the system 10 may be controlled by the service provider. For example, the measure may be provided by the system 10 back to the app running on the WED 12 and/or to a service provider facility in communication with the app. The service provider may request the system 10 to provide the measure at various times, such as when an app is first opened, periodically, continually, tied to actions, etc.

The system 10 may be employed by various type of requesting entities, such as service providers, such as banks, retailers, etc. to provide authentication of the WED 12 prior to the delivery of services, companies and institutions controlling access to devices, systems or facilities, etc. For example, a bank or retailing app running on WED 12 may access and request the system 10 to provide a confidence level that the WED 12 is in an environment consistent with its wireless signal identity before enabling the WED 12 to access the entity's system and perform various functions. One of skill in the art will appreciate that the confidence level that the service provider may require will likely depend upon the type of interaction the WED 12 will be performing with the entity. For example, online banking and other transactions may require that a very high confidence level, perhaps 0.9 on a 0-1 confidence scale, be provided by the system 10 before allowing transactions to occur. Other applications, such as social networking, gaming, etc. may employ lower confidence levels or other measures.

In various embodiments, the system 10 may provide authentication based on the self-similarity of the present action with one or more prior patterns of action. In other words, comparing the current activity with prior activity for the WED 12. The activity may be relevant to apps running on the WED 12 or to interactions with other WEDs and systems. The system 10 may make the comparison and return a measure, such as a confidence level, based on the comparison.

For example, various entities may request the system 10 to provide a measure indicative of a comparison between the wireless signals presently being detected by the WED 12 and the wireless signal detected by the WED 12 during a different period of time. The comparison between the wireless signals detected the WED 12 over two different periods of time will produce a measure distinct, but not necessarily different, from the comparison of the wireless signals presently being detected with the wireless signal identity for the WED 12.

The time period, or self-similarity, measure may be used by the requesting entity to take action that may be different than the action that might have been taken based on the comparison with the signal identity. The self-similarity measure may be useful when the user undertakes patterns of conduct that are different than the patterns used in developing the wireless signal identity, such as traveling, new activities, etc. These new patterns may be temporary, such as travel, or persist, such as changing work or housing locations and/or situations.

The present invention may be useful in managing a migration and/or sharing of services, such as phone numbers, apps, data, etc., from an old device to a new device or among the old and new device. In various embodiments, the new device may have software and/or hardware installed that enables the new device to be a WED 12 in the system 10. The service provider may request the system 10 to provide a confidence level or other measure that how well wireless signals detected by the new device compare the wireless signal identity of the old device. The service provider may use the measure to decide whether or not to permit the migration and/or use of telephone numbers and other services, apps, and data from the old device to the new device. The WDI of the old device may be provided by the requesting entity, e.g., mobile communications carrier, bank, etc. to the system 10 along with the wireless signals detected by the new device to enable the system 10 to make the comparison.

The aforementioned functionality may be useful in providing security when multiple wireless-enabled devices may be associated with a single user and something of value may be transferred from one of the devices (e.g. old phone) to the other (e.g. new phone). For example, a threat actor engages the victim's wireless carrier (ex. through a call center or web portal) with the goal of fraudulently convincing the carrier to move the victim's phone number to a new mobile device (new phone) under the threat actor's control. This attack is commonly referred to as "SIM swap fraud" and is a precursor to an "account takeover (ATO)" where, once the victim's phone number is moved to the new device, the threat actor can bypass 2-factor authentication for a wide variety of services (social media, banking, etc.) because any SMS codes or push notifications will be sent to the new phone under the threat actor's control. In a second example, a threat actor attempts to move one or more of a victim's high-value mobile apps (e.g., mobile banking app) to a mobile phone under the threat actor's control. In some cases, the high-value app may contain personally identifiable information ("PII") of interest to the threat actor or keys/tokens that are needed to access the victim's account.

In both examples, the system 10 may be used to compare the most recent wireless signals that the "new phone" detects to a time range of historical signal contexts (ex. the last two weeks) detected by the "old phone" and/or the wireless signal identity of the "old phone". If the "new phone" is not detecting wireless signals that are "familiar and frequent" to the "old phone" then the system 10 will provide a low measure indicative of a mismatch between the recently detected wireless signals and the wireless signal identity. The carrier may use this low measure from the system 10 to reject, flag, or further scrutinize the request to move phone service or mobile apps to the "new phone". On the contrary, if, at the time of the request, the "new phone" is detecting wireless signals that are "familiar and frequent" to the historical context of the "old phone", then the system 10 may provide high measure that may be used as further validation that the request is authentic.

In migration, sharing, transactions, and other processes, where a service provider or other requesting entity, may desire or require devices to be physically co-located, the system 10 may be used to provide a confidence level or other co-location measure to the requesting entity. In various embodiments, two or more devices participating in the process may have software and/or hardware installed that enables the devices to be WEDs 12 in the system 10. The system 10 may compare a first set of wireless signals being received by a first device with a second set of wireless signals from a second device and provide a confidence level or other co-location measure that the devices are co-located. In most instances, co-located WEDs 12 may often detect identical sets of wireless signals; however, differences in receiver sensitivity, performance, relative proximity of the devices, etc. may result in less than a 100% match. In other co-location embodiments, the requesting entity may request a co-location measure that the first WED 12 is detecting wireless signals emitted by the other devices involved in the process, which may not be WEDs 12 communicating with the management platform 14 in the system 10.

The system 10 may generally be used to provide confidence levels or other measures relative to the wireless signal identity of the WED 12 for service management purposes. A service provider may periodically request a confidence level relative to the wireless signal identity of the WED 12 and take action accordingly. For example, a dramatic and/or persistent deviation in the wireless signals detected by the WED 12 may be indicative of a lost or stolen device. The system 10 may be configured to provide the measure on a regular and/or threshold basis to various requesting entities as a service.

In other applications, a user may be able to swipe a credit card, use a mobile payment app, or other method to initiate a transaction or other action in a point of sale (POS) system or other system that may be authenticated with the system 10. The POS system may be, include, or be associated with, a WED 12 in the system 10. For example, the service provider's WED 12 detecting wireless signals may be a wireless access point, a dedicated wireless detector, or a wirelessly enabled point of sale device, such as a credit card processor, cash register, etc. The wireless signals detected by the service provider system may be compared with the wireless signals being detected by the WED 12 of the user engaging in the transaction to provide a confidence level that the user's WED 12 and the POS system are co-located. In addition, the service provider may provide a WDI associated with a user account to the system 10 and the system 10 may, in turn, confirm the presence of the WDI of the user's WED 12 in the wireless signals detected by the POS system.

The confidence level or other measure may be a continuous scale and/or tiered levels of confidence. For example, the confidence level may be a straight or weighted percentage of the number of WDIs in the second set that match the WDIs in the wireless signal identity at a given day and time. All WDIs matching being 1 or 100% and no matching WDIs being 0 or 0%. The service provider or administrator querying the system 10 may determine whether to grade the different percentages as indications of confidence. For some applications, the detection of a first WED 12 by a second WED 12 that is a strong contributor to the wireless signal identity of the second WED, such as a phone and wearable, may provide a sufficiently high measure from the system 10 for authentication of the action requested of the requesting entity.

Figure 2:
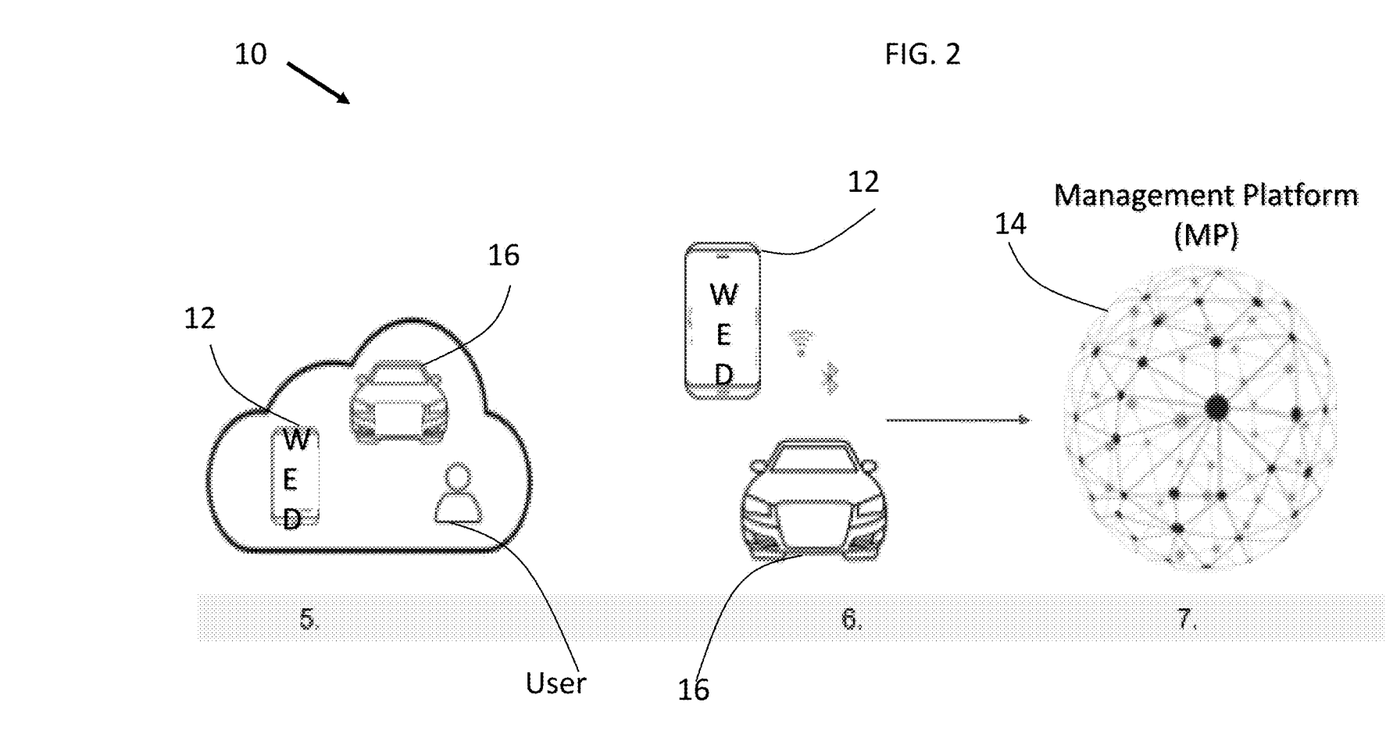
FIG. 2 illustrates exemplary interactions of a WED in the system.

FIG. 2 illustrates exemplary embodiments of the system 10 in which the system (depicted as a cloud) 10 associates WEDs 12 with users and with Internet of Things (IoT) devices 16, such as vehicle, based on wireless signals detected by the WED 12. The association in the system 10 of the user, the WED 12, and the IoT devices 16 may be developed by the system 10 into the wireless signal identity for the WED 12 as it detects wireless signals, which may be a function of day, time, and other variables.

In various embodiments, service providers, administrators, and other requesting entities may take various actions depending upon the confidence level provided by the system 10. For example, when the user's phone is within Bluetooth range of the user's computer, which is a WED 12 in the system 10, and the computer is connected to the user's home network, the system 10 may provide a high confidence level to the computer, which may be configured to decrease access requirements of the user. In another scenario, the service provider requesting a confidence level from the system 10 may set a limit on the amount of money that may be charged without the user entering a PIN even if the system 10 provides the highest confidence level of authentication. One of ordinary skill will appreciate that many other types of permissions may be provided for by entities requesting confidence measures from the system 10. Those permissions may be determined by the requesting entities seeking confidence measures from the system 10.

Figure 3:
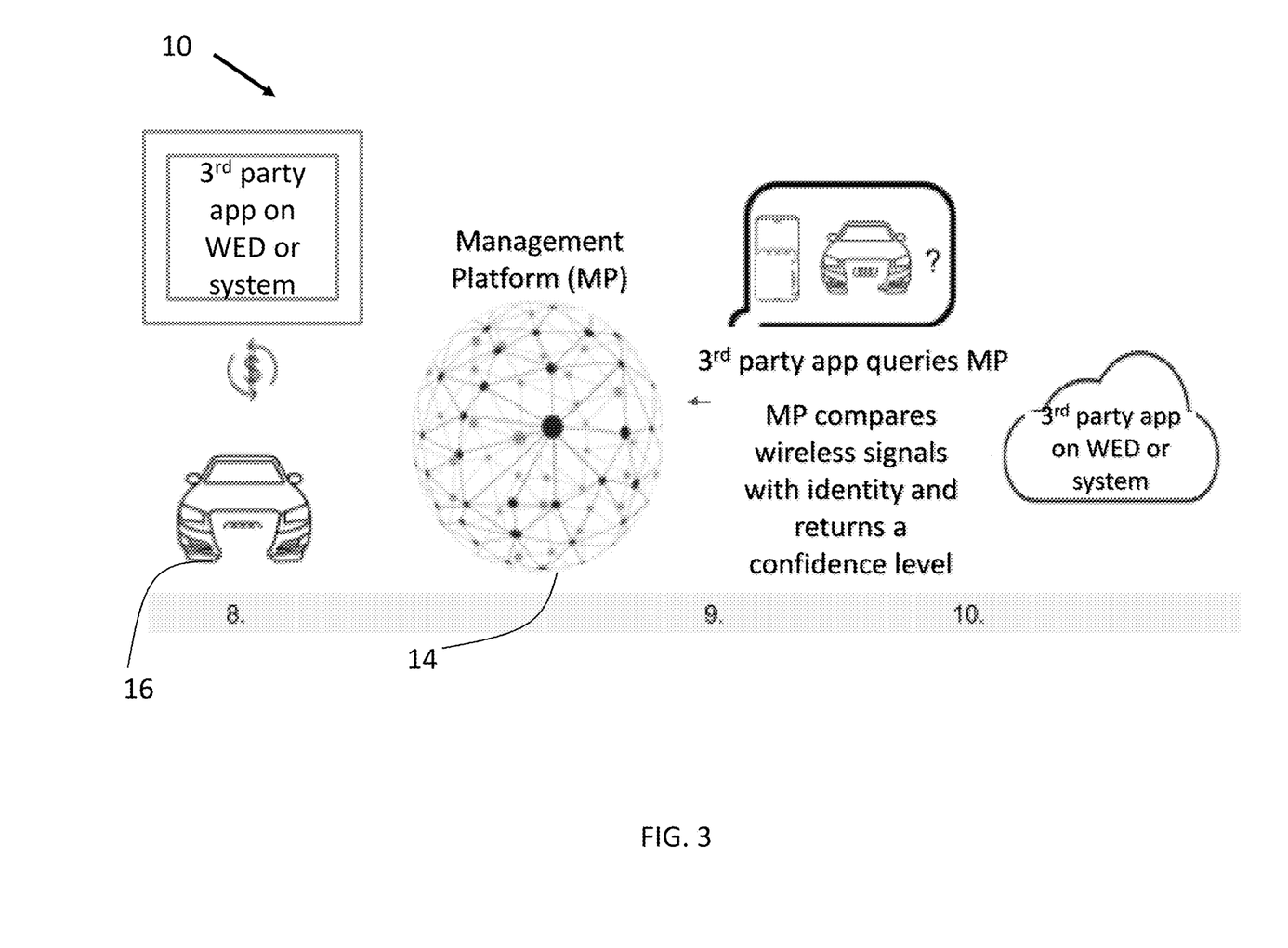
FIG. 3 illustrates exemplary interaction of a WED and a third party with the system.

FIG. 3 shows various embodiments of the system 10 in which various requesting entities may request a confidence level or other measure from the system 10 regarding one of more WEDs 12 before providing various services, such as merchant or banking transactions. The requesting entity may subscribe to, or interact with, the system 10, such that the requesting entity may query the system 10 for various authentication reasons, such as to receive an authentication status, or confidence level concerning IoT device 16, WED 12, etc. The interaction of the requesting entity system with the system 10 may typically be via some form of application programming interface (API), or more generally software, running on the WED 12 and/or a device or system of the requesting entity that allows the system 10 to communicate in a predetermined manner to provide the requested measures. The requesting entity may initiate a request, or query, of the system 10 about the confidence level or other measure of the IoT device 16, WED 12 or user. The system 10, via the management platform 14, may respond by providing a measure of authentication based on comparing the wireless signals in a requested manner that may be used by the third party to support various actions, such as Yes or No access decisions and other confidence level based actions.

In practice, it may be desirable for the WED 12 to receive the wireless signals, determine/extract the WDIs and other wireless signal information, e.g., date, time, and location of detection, signal strength, etc., and transmit the wireless signal information to the management platform 14 via a wireless interface. The wireless signal information may be received by a communication interface of the management platform 14 and stored in database of the management platform 14 in one or more record associated with the WED 12 and/or user. One or more processors in the management platform 14 and/or the WED 12 may analyze the wireless signal information received by the WED 12 to determine a level of confidence concerning the WED 12 and the user that may be used to providing an authentication measure to entities requesting authentication.

The WED 12 may subsequently continue to detect wireless signals, determine the wireless signal information associated with the wireless signals, and transmit these subsequent wireless signal information as a subsequent set to the management platform 14. The transmission of wireless signal information may be performed in a wide variety of ways depending upon the specific application of the system 10. For example, WEDs 12 may date/time/location stamp a set of wireless signals detected in a close proximity in time, then may not transmit information until the set of detected wireless signals changes. The WED 12 may also transmit detected wireless signal information at regular or irregular intervals.

Upon receipt of the subsequent set of wireless signals from the WED 12, the management platform 14 may analyze and compare wireless signal information associated with the subsequent set of wireless signals to the wireless signal identity of the WED 12 to determine how the subsequent set of wireless signals maps onto, or compares to, the wireless signal identity of the WED 12. In this manner, the system 10 may provide for various frequencies of authentication and verification that may be tailored to the activity of a user and needs of the requesting entity. For example, when subsequent sets of wireless signals continue to map exactly or nearly exactly onto the wireless signal identity of the WED 12, other devices either associated with the user or WED 12 or interacting with the system 10 may gain confidence from the match and provide increased levels of access to devices and applications, such as reduced access control requirements.

The extent to which the wireless signal information from a second set of wireless signal compares to the wireless signal identity of the WED 12 may be used as a measure, e.g., status indicator, measure of confidence, or confidence level, that the WED 12 is at least operating in a normal use pattern. For example, an exact mapping of the second set of wireless signals onto the wireless signal identity of the WED 12 may provide a very strong indicator or measure that the WED 12 is in the possession of its owner, or primary user. Conversely, when the wireless signal information from the second set of wireless signals does not map at all onto the wireless signal identity, particularly recent detections, the lack of mapping is a weak indicator or measure of the WED 12 operating in a pattern normally associated with the WED 12.

When deviations are detected by the system 10 between the wireless signals being detected and the wireless signal identity, the system 10 may be configured to provide notice to the third parties associated with the WED 12. The notice may enable the third parties to deny access and require additional actions be taken by the user of the system 10, such as prompting a user to answer security questions or to undergo second-factor authentication.

While the strength or weakness of the comparison to the wireless signal identity is not an absolute determination of whether the device is in the possession of the owner, the comparison can provide a measure of confidence, or indicator, that may be used to enable convenience and/or security features on the WED 12, associated devices of the user, or third party transactions. The measure of confidence, or confidence factor or level, may vary depending upon the size of the set of wireless signal being provided to the system 10. For example, a large set that maps well onto the wireless signal identity may provide a higher confidence level than a smaller set. However, as most recent wireless signal detections deviate from the wireless signal identity, the confidence level needs to reflect that deviation rapidly to be effective from an authentication and verification standpoint.

It will be appreciated that when third parties are querying the system 10 for confidence levels, the third party and/or the system operator may prefer that the confidence level is provided by the management platform 14, rather that the WED 12 itself, as it may be easier to protect the management platform from tampering than the WED 12, particularly by an unauthorized user of the WED 12. However, in various embodiments of the system 10, the functions that may typically be associated with the management platform 14 may be performed individually on the WED 12. WEDs 12 performing those functions may or may not interact with the management platform 14 and/or other WEDs 12 in the system 10 depending upon its configuration. For example, the WEDs 12 may develop and use the wireless signal identity locally, but may provide the wireless signal identity and/or detected wireless signals to the management platform 14 for redundancy, security, layered services, and various other reasons known to those of skill in the art.

FIGS. 1-3 further show exemplary interactions in the system 10 and with third parties in ten exemplary steps with FIG. 1 (steps 1-4), FIG. 2 (steps 5-7), and FIG. 3 (steps 8-10). The exemplary steps are:

1. The WED 12 may be enabled with system 10 software that sends to the management platform 14 wireless signal information associated with wireless signals that the WED 12 detects. The software may be a stand-alone app or as part of another app, such as an app of a service provider or access administrator, e.g., communications, banking, a business, a vehicle manufacturer, etc.
2. As the user of the WED 12 moves about the world, the WED 12 detects wireless signals, such as WiFi, Bluetooth, and BLE signals from other wireless devices, such as routers, wearables, smart home appliances, cars, etc., and reports them to the management platform 14 via a network connection.
3. The management platform 14 recognizes signal clusters of wireless signals from WEDs 12 in physical proximity to each other, and reveals those clusters with which the user has significant relationships (including, for example, home, work, and office), generally based on frequency of interaction with the wireless devices for various days, times, and/or locations.
4. Within a period of time, the management platform 14 may build a unique wireless signal identity for the WED 12 from its behavioral patterns moving through the wireless world.
5. The system 10 may associate frequently encountered WEDs 12, the IoTs 16, and other wireless devices with the wireless signal identity, which may be used to provide various measures that may be used for authentication by entities requesting the measure from the system. In the present example, the IoT device 16 may be a vehicle, which may or may not be enabled as a WED 12 that transmits and/or receives wireless signals in the system 10. For example, a vehicle manufacturer may provide an app that enables the user to register the vehicle and tie together the app and the vehicle with a wireless signal identity of one or more WEDs 12.
6. As the vehicle is moving, the WED 12 and/or IoT device 16 may be detecting wireless signals, e.g., WiFi and Bluetooth signals from other WEDs that may be encountered during travel.
7. The system software running on the WED 12 may report wireless signal information associated with the wireless signal detected to the management platform 14 via a network connection in real-time or otherwise. The wireless signal information associated with the wireless signals encountered may or may not become part of the vehicle wireless signal identity and/or WED 12 wireless signal identity depending upon the system configuration and/or status of the devices.
8. The user of the WED 12 may initiate an action, such as by opening an application, turning on a wireless device, etc., and the software on the WED 12 and/or running on another device of the third party, acting as a requesting entity, requests the system 10, typically the management platform 14, to provide a confidence level or other measure that the WED 12 is operating in accordance with its wireless signal identity. For example, the user may initiate a transaction from the IoT device 16, such as a payment for gas with a third party, using an application and/or POS system.
9. A third party application running on the WED 12 may communicate via the WED 12 to the management platform 14 to request the measure or may communicate with the system 10 via a third party facilities. The third party acting as the requesting entity may want to receive various measures depending upon the particular activity involved, such as based on wireless signals detected from the user's WEDs 12 and/or IoT devices 16, confirming the physical proximity of various devices and checking that wireless signal detection behavior has not diverged from its wireless signal identity in the very recent past.
10. The management platform 14 may respond to the third party providing a confidence level or other measure based on the comparison between the detected wireless signals. The third party may use the measure to enable a confidence-based determination of the verification requirements to impose on the driver of the vehicle, or person engaging in the transaction, etc. Given a high confidence, the third party may choose to enable the transaction with a reduced level of verification, i.e., seamlessly, or given low confidence, prompt the driver/user for additional steps (fingerprint, username/password, PIN, show ID, etc.) to increase the third party's confidence level that the user and/or device is authorized to engage in the transaction.

In addition, the system 10 may be used by third parties to provide additional levels of security, authentication, and verification. For example, if the system 10 may be configured to inform the third party if the measure falls below a minimum threshold, which may indicate that the WED 12 and/or IoT device 16 is missing or stolen.

In various embodiments, the verification process may be used inversely with the user WEDs 12 and IoT devices 16. Network equipment (routers, repeaters, beacons, etc.), appliances, doorbells, exterior lights, etc. in and around a home, office, etc. may gather wireless signals and take various actions when a newly detected WED is known and when it is unknown. For example, if an unknown WED is detected in or near the house, the system 10 may decrease the confidence level or other measure provided to third parties, such that the third party may increase the level of authentication required and/or send a notice to one or more people, such as the owner, security, police, etc., of the unknown WED. Similarly, when WEDs 12 no longer detect wireless signals from WEDs that are expected to be present, the system 10 may decrease the confidence level or other measure provided to third parties.

Figure 4:
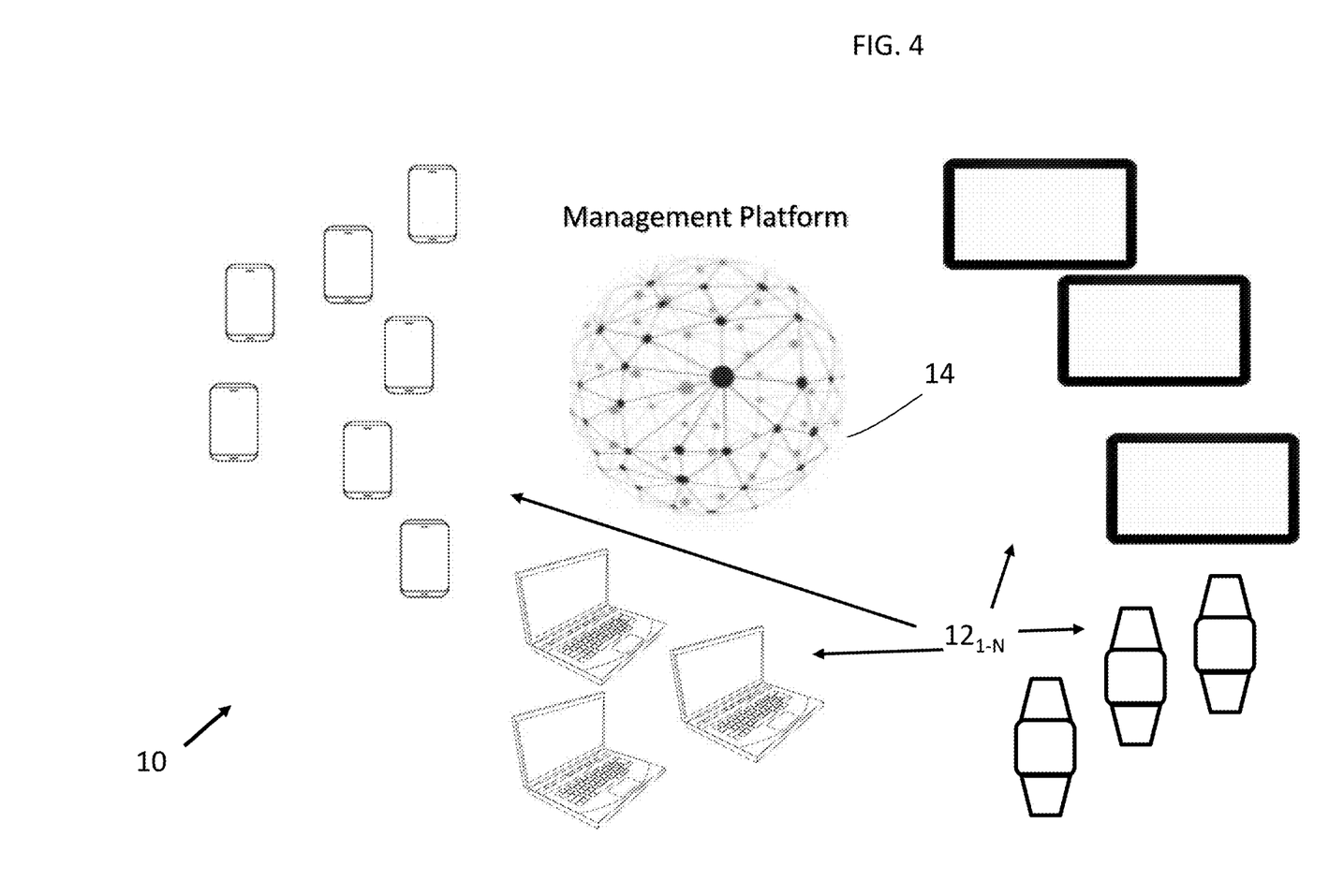
FIG. 4 illustrates exemplary embodiments of the system.

FIG. 4 depicts various embodiments of the system 10 in which of a plurality of WEDs $12_{1-N}$ are operating in the system 10 and simultaneously, or nearly so, interacting with the management platform 14 on a near continuous, frequent, or infrequent basis. While much of the description regarding the system 10 with respect to FIGS. 1-3 has concerned one WED 12 to ease description, it will be appreciated that it may be desirable to scale the system 10 from ones to billions of detected signals, devices, and users and the extent of the scaling may necessarily require that the skilled practitioner make hardware, software, system, and network design decision with scale in mind.

Similarly, the management platform 14 has been generally described generically as a platform. Of course, when considered in the context of a system 10 that may scale into the billions or more devices and wireless signal interactions, it will be appreciated that while the management platform 14 may be considered in various embodiments as centralized relative to the WEDs 12 at a system architecture level, the processing, storage, and other resources of the management platform 14 may be distributed among multiple local and remote units that are dedicated or cloud-based resources in communication as necessary to execute the functions of the systems 10 at a desired performance level.

In addition, while the invention has been described relative to any wireless signal type and technology, it will be appreciated that it may be desirable to constrain the system 10 to a smaller set of wireless technologies, which will reduce the amount of WEDs detected and tracked. For example, it may be desirable to focus the system 10 on wireless protocols that are shorter range, LAN, PAN, etc., and with more commonly used protocols, such as the various WiFi and Bluetooth protocols. However, such decisions may vary depending upon how the skilled artisan is implementing the system 10.

Figure 5:
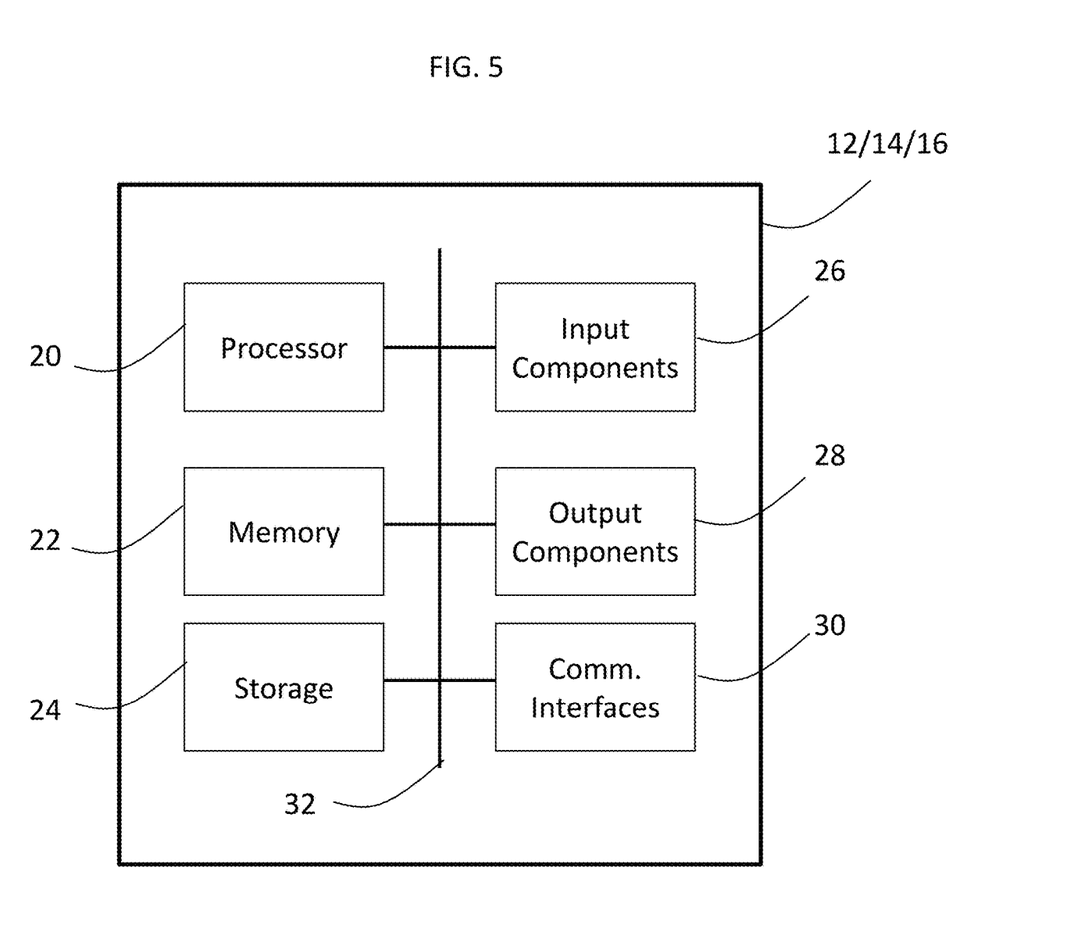
FIG. 5 illustrates exemplary components in various computing resources of the system.

FIG. 5 illustrates exemplary component embodiments that may be employed in the WEDs $12_{1-N}$, management platform 14, and IoT devices 16 of the system 10, which may be generally referred to as "computing resources". The computing resources may each include one or more processors 20, memories 22, storage components 24, input components 26, output components 28, communication interfaces 30, as well as other components that may be interconnected as desired by the skilled artisan via one or more buses 32. As previously described, while the components for the WED 12 and IoT devices 16 may often be configured as a single device or multiple devices in close proximity, the management platform 14 may have multiple components in one or more coupled units, distributed in close proximity, and/or over geographically remote areas.

Processor(s) 20 may include one or more central processing units (CPU), graphics processing units (GPU), accelerated processing units (APU), microprocessors, and/or any processing components, such as a field-programmable gate arrays (FPGA), application-specific integrated circuits (ASIC), etc.) that interpret and/or execute instructions. The processors 20 may contain cache memory units for temporary local storage of instructions, data, or computer addresses and may be implemented as a single-chip, multiple chips and/or other electrical components including one or more integrated circuits and printed circuit boards that implements and executes logic in hardware, in addition to executing software.

Processor(s) 20 may connect to other computer systems and/or to telecommunications networks as part of performing one or more steps of one or more processes described or illustrated herein, according to particular needs. Moreover, one or more steps of one or more processes described or illustrated herein may execute solely at the processor 20. In addition or as an alternative, one or more steps of one or more processes described or illustrated herein for execution in one processor may be executed at multiple CPUs that are local or remote from each other across one or more networks.

The computing resources of the system 10 may implement processes employing hardware and/or software to provide functionality via hardwired logic or otherwise embodied in circuits, such ads integrated circuits, which may operate in place of or together with software to execute one or more processes or one or more steps of one or more processes described or illustrated herein. Software implementing particular embodiments may be written in any suitable programming language (e.g., procedural, object oriented, etc.) or combination of programming languages, where appropriate.

Memory 22 may include random access memory (RAM), read only memory (ROM), and/or another type of dynamic or static storage device, such as flash, magnetic, and optical memory, etc. that stores information and/or instructions for use by processor 20. The memory 22 may include one or more memory cards that may be loaded on a temporary or permanent basis. Memory 22 and storage 24 may include a subscriber identification module (SIM) card and reader.

Storage components 24 may store information, instructions, and/or software related to the operation of the system 10 and computing resources. Storage 24 may be used to store operating system, executables, data, applications, and the like, and may include fast access primary storage, as well as slower access secondary storage, which may be virtual or fixed.

Storage component(s) 24 may include one or more transitory and/or non-transitory computer-readable media that store or otherwise embody software implementing particular embodiments. The computer-readable medium may be any tangible medium capable of carrying, communicating, containing, holding, maintaining, propagating, retaining, storing, transmitting, transporting, or otherwise embodying software, where appropriate. The computer-readable medium may be a biological, chemical, electronic, electromagnetic, infrared, magnetic, optical, quantum, or other suitable medium or a combination of two or more such media, where appropriate. The computer-readable medium may include one or more nanometer-scale components or otherwise embody nanometer-scale design or fabrication. Example computer-readable media include, but are not limited to fixed and removable drives, application-specific integrated circuits (ASICs), CDs, DVDs, field-programmable gate arrays (FPGAs), floppy disks, optical and magneto-optic disks, hard disks, holographic storage devices, magnetic tape, caches, programmable logic devices (PLDs), random-access memory (RAM) devices, read-only memory (ROM) devices, semiconductor memory devices, solid state drives, cartridges, and other suitable computer-readable media.

Input components 26 and output components 28 may include various types of input/output (I/O) devices. The I/O devices often may include a graphical user interface (GUI) that provides an easy to use visual interface between the user and system 10 and access to the operating system or application(s) running on the devices.

Input components 26 receive any type of input in various forms from users or other machines, such as touch screen and video displays, keyboards, keypads, mice, buttons, track balls, switches, joy sticks, directional pads, microphones, cameras, transducers, card readers, voice and handwriting inputs, and sensors for sensing information such as temperature, location via global positioning system (GPS) or otherwise, accelerometer, gyroscope, actuator data, which may be input via a component in the user device 12 or received via one or more communication interfaces 30.

Output component 28 may include displays, speakers, lights, sensor information. Similar to the input, the output may be provided via one or more ports and/or one or more communication interfaces 30.

Communication interface 30 may include one or more transceivers, receivers, transmitters, modulators, demodulators that enable communication with other devices, via wired and/or wireless connections. Communication interface 30 may include Ethernet, optical, coaxial, universal serial bus (USB), infrared, radio frequency (RF) including the various Wi-Fi, WiMax, cellular, and Bluetooth protocols, etc. as described herein and known in the art.

Bus(es) 32 may connect a wide variety of other subsystems, in addition to those depicted, and may include various other components that permit communication among the components in the computing resources. The bus(es) 32 may encompass one or more digital signal lines serving a common function, where appropriate, and various structures including memory, peripheral, or local buses using a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

The computing resources of the system 10 may provide functionality as a result of the processors 20 executing software embodied in one or more computer-readable storage media residing in the memory 22 and/or storage 24 and logic implemented and executed in hardware. The results of executing the software and logic may be stored in the memory 22 and/or storage 24, provided to output components 28, and transmitted to other devices via communication interfaces 30. In execution, the processor 20 may use various inputs received from the input components 26 and/or the communications interfaces 30. The input may be provided directly to the processor 20 via the bus 32 and/or stored before being provided to the processor 20. Executing software may involve carrying out processes or steps may include defining data structures stored in memory 22 and modifying the data structures as directed by the software.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

As used herein, the term component is intended to be broadly construed as hardware and software, and/or a combination of hardware and software, including firmware, etc. It will also be apparent that systems and/or methods, described herein, may be implemented in different forms of hardware and software, or combinations thereof. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Hardware processor modules may range, for example, from general-purpose processors to field programmable gate arrays (FPGA) to an application specific integrated circuits (ASIC), and combinations thereof. Software modules (executed on hardware) may be expressed in a variety of software languages (e.g., computer code), including C, C++, Java, Javascript, Rust, Go, Scala, Ruby, Visual Basic, FORTRAN, Haskell, Erlang, and/or other object-oriented, procedural, or other programming language and development tools. Computer code may include micro-code or micro-instructions, machine instructions, such as produced by a compiler, code used to produce a web service, and files containing higher-level instructions that are executed by a computer using an interpreter and employ control signals, encrypted code, and compressed code.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Even though particular combinations of features are recited in the claims and/or disclosed in the specification, these combinations are not intended to limit the scope of the claims. Although each dependent claim listed below may directly depend on only one claim, the disclosure of possible implementations includes each dependent claim in combination with every other claim in the claim set. Elements and methods of the present invention may be combined in ways not specifically recited in the claims and/or disclosed in the specification by persons of ordinary skill in the art and are intended to be covered by the claims.

What is claimed is:

1. A method comprising:
receiving, by a management platform, first wireless signal information, wherein the first wireless signal information represents a first set of wireless signals that were emitted by a set of one or more other devices and were detected by a first wireless-enabled device (WED) at a first time period;
developing, by the management platform, a wireless signal identity for the first WED based on the first wireless signal information;
receiving, by the management platform, a request from a requesting entity, wherein the request comprises:
a first request for a first measure comparing second wireless signal information, wherein the second wireless signal information represents a second set of wireless signals detected by a second WED at a second time period after the first time period, to the wireless signal identity of the first WED, wherein the second WED is a device to which a migration from the first WED is to be performed, and
a second request for a second measure comparing third wireless signal information, wherein the third wireless signal information represents a third set of wireless signals detected by the first WED at the second time period, to the second wireless signal information;
receiving, by the management platform, the second wireless signal information;
comparing, by the management platform, the second wireless signal information with the wireless signal identity of the first WED; and
providing, by the management platform, the requesting entity the first measure;
receiving, by a management platform, the third wireless signal information from the first WED;
comparing, by the management platform, the second wireless signal information with the third wireless signal information;
providing, by the management platform, to the requesting entity the second measure;
determining that one or more criteria for the migration are met based on the first measure and the second measure, wherein determining that the one or more criteria are met comprises:
determining that the first measure is not a low measure indicative of a determination that the second WED is not detecting signals that are familiar and frequent to those detected by the first WED, wherein a low measure is associated with rejection of the request to perform the migration; and
determining that the first measure is a high confidence measure indicative of a determination the second WED is detecting signals that are familiar and frequent to those detected by the first WED, wherein a high measure is associated with approval of the request to perform the migration, such that determination of the high measure streamlines the migration; and
wherein the migration from the first WED to the second WED is performed in accordance with the determination that one or more criteria for the migration are met based on the first measure and the second measure.

2. The method of claim 1, wherein the first measure is used by the requesting entity to determine an action.

3. The method of claim 1, wherein:
the first measure provided by the requesting entity is used to authenticate a sharing service between the first WED and the second WED.

4. The method of claim 1, wherein the first measure is a confidence level based on mismatches and matches between the second wireless signal information and the wireless signal identity.

5. The method of claim 1, wherein the first measure is a confidence level between 0 and 1 based on the comparison.

6. The method of claim 1, wherein at least some of the first and second wireless signal information is encrypted by at least one of the first WED, the second WED, and the management platform.

7. The method of claim 1, further comprising:
modifying, by the management platform, the wireless signal identity based on additional wireless signal information, wherein the additional wireless signal information represents additional wireless signals that were detected by the first WED.

8. The method of claim 1, wherein the requesting entity takes different actions depending upon a confidence level provided as the measure.

9. A non-transitory computer readable medium storing instructions which, when executed by one or more processors, cause the one or more processors to:
receive first wireless signal information, wherein the first wireless signal information represents a first set of wireless signals that were emitted by a set of one or more other devices and were detected by a first wireless-enabled device (WED) at a first time period;
develop a wireless signal identity for the first WED based on the first wireless signal information;
receive a request from a requesting entity, wherein the request comprises:
a first request for a first measure comparing second wireless signal information, wherein the second wireless signal information represents a second set of wireless signals detected by a second WED at a second time period after the first time period, to the wireless signal identity of the first WED, wherein the second WED is a device to which a migration from the first WED is to be performed, and a second request for a second measure comparing third wireless signal information, wherein the third wireless signal information represents a third set of wireless signals detected by the first WED at the second time period, to the second wireless signal information;
receive the second wireless signal information;
compare the second wireless signal information with the wireless signal identity of the first WED; and
provide the requesting entity the first measure;
receive the third wireless signal information from the first WED;
compare the second wireless signal information with the third wireless signal information;
provide to the requesting entity the second measure;
determine that one or more criteria for the migration are met based on the first measure and the second measure, wherein determining that the one or more criteria are met comprises:
  determining that the first measure is not a low measure indicative of a determination that the second WED is not detecting signals that are familiar and frequent to those detected by the first WED, wherein a low measure is associated with rejection of the request to perform the migration; and
  determining that the first measure is a high confidence measure indicative of a determination the second WED is detecting signals that are familiar and frequent to those detected by the first WED, wherein a high measure is associated with approval of the request to perform the migration, such that determination of the high measure streamlines the migration; and
wherein the migration from the first WED to the second WED is performed in accordance with the determination that one or more criteria for the migration are met based on the first measure and the second measure.

10. A system comprising:
a management platform including at least one processor and an associated memory, wherein the processor is configured to:
receive first wireless signal information, wherein the first wireless signal information represents a first set of wireless signals that were emitted by a set of one or more other devices and were detected by a first wireless-enabled device (WED) at a first time period;
develop a wireless signal identity for the first WED based on the first wireless signal information;
receive a request from a requesting entity, wherein the request comprises:
  the first WED is to be performed, and a second request for a second measure comp a first request for a first measure comparing second wireless signal information, wherein the second wireless signal information represents a second set of wireless signals detected by a second WED at a second time period after the first time period, to the wireless signal identity of the first WED, wherein the second WED is a device to which a migration from the first WED ia to be performed, and
  a second request for a second measure comparing third wireless signal information, wherein the third wireless signal information represents a third set of wireless signals detected by the first WED at the second time period, to the second wireless signal information;
receive the second wireless signal information;
compare the second wireless signal information with the wireless signal identity of the first WED; and
provide to the requesting entity the first measure;
receive the third wireless signal information from the first WED;
compare the second wireless signal information with the third wireless signal information;
provide to the requesting entity the second measure; and
determine that one or more criteria for the migration are met based on the first measure and the second measure, wherein determining that the one or more criteria are met comprises:
  determining that the first measure is not a low measure indicative of a determination that the second WED is not detecting signals that are familiar and frequent to those detected by the first WED, wherein a low measure is associated with rejection of the request to perform the migration; and
  determining that the first measure is a high confidence measure indicative of a determination the second WED is detecting signals that are familiar and frequent to those detected by the first WED, wherein a high measure is associated with approval of the request to perform the migration, such that determination of the high measure streamlines the migration; and
wherein the migration from the first WED to the second WED is performed in accordance with the determination that one or more criteria for the migration are met based on the first measure and the second measure.

11. The system of claim 10, wherein the first measure is used by the requesting entity to determine an action.

12. The system of claim 10, wherein:
the first measure provided by the requesting entity is used to authenticate a sharing service between the first WED and the second WED.

13. The system of claim 10, wherein the first measure is a confidence level between 0 and 1 based on the comparison.

14. The system of claim 10, wherein at least some of the first and second wireless signal information is encrypted by at least one of the first WED, the second WED, and the management platform.

15. The system of claim 10, wherein the processor is further configured to:
modify the wireless signal identity based on additional wireless signal information, wherein the additional wireless signal information represents additional wireless signals that were detected by the first WED.

16. The system of claim 10, wherein the requesting entity takes different actions depending upon a confidence level provided as the first measure.

* * * * *